US008877847B2

(12) United States Patent
Federici et al.

(10) Patent No.: US 8,877,847 B2
(45) Date of Patent: Nov. 4, 2014

(54) PAPER COATING COMPOSITIONS

(75) Inventors: Franco Federici, Busto Arsizio (IT); Thierry Bossi, Azzio (IT); Stefano Fumagalli, Carnago (IT); Riccardo Vago, Arcisate (IT); Giovanni Floridi, Novara (IT); Giuseppe Li Bassi, Gavirate (IT)

(73) Assignee: Lamberti SpA, Albizzate (VA) (IT)

( * ) Notice: Subject to any disclaimer, the term of this patent is extended or adjusted under 35 U.S.C. 154(b) by 0 days.

(21) Appl. No.: 13/824,190

(22) PCT Filed: Aug. 30, 2011

(86) PCT No.: PCT/EP2011/064912
§ 371 (c)(1),
(2), (4) Date: Mar. 15, 2013

(87) PCT Pub. No.: WO2012/034849
PCT Pub. Date: Mar. 22, 2012

(65) Prior Publication Data
US 2013/0180433 A1    Jul. 18, 2013

(30) Foreign Application Priority Data
Sep. 15, 2010 (IT) .............................. VA2010A0066

(51) Int. Cl.
*C08K 3/26* (2006.01)
*D21H 19/60* (2006.01)
*C08L 63/00* (2006.01)
*C08G 59/06* (2006.01)
*C09D 17/00* (2006.01)
*D21H 19/62* (2006.01)
*C08G 59/18* (2006.01)
*C08L 71/02* (2006.01)
*C08G 59/24* (2006.01)
*D21H 21/10* (2006.01)

(52) U.S. Cl.
CPC ............... *D21H 19/62* (2013.01); *D21H 19/60* (2013.01); *C08L 63/00* (2013.01); *C08G 59/066* (2013.01); *C09D 17/001* (2013.01); *D21H 21/10* (2013.01); *C08G 59/18* (2013.01); *C08L 71/02* (2013.01); *C08G 59/245* (2013.01)
USPC ............... 524/425; 524/6; 524/423; 524/447; 524/451; 524/497; 528/89

(58) Field of Classification Search
USPC ......... 524/6, 423, 425, 447, 451, 497; 528/89
See application file for complete search history.

(56) References Cited

U.S. PATENT DOCUMENTS 4,122,067 A * 10/1978 Anderson ........................ 528/89

FOREIGN PATENT DOCUMENTS

| WO | 0196007 A1 | 12/2001 |
| WO | 2004041883 A1 | 5/2004 |
| WO | 2004044022 A1 | 5/2004 |
| WO | 2007069037 A1 | 6/2007 |

* cited by examiner

*Primary Examiner* — Peter Szekely
(74) *Attorney, Agent, or Firm* — Mossman, Kumar & Tyler PC

(57) ABSTRACT

Paper coating compositions contain specific polyethers which are obtained by reacting a diglycidyl ether with a water soluble polyol containing at least one polyoxyethylene chain acting as deflocculants, water retention agents and gloss enhancers.

20 Claims, No Drawings

PAPER COATING COMPOSITIONS

TECHNICAL FIELD

The present invention relates to paper coating compositions that contains specific polyethers as deflocculants, water retention agents and gloss enhancers; the polyethers are obtained by reacting a diglycidyl ether with a water soluble polyol containing at least one polyoxyethylene chain.

BACKGROUND ART

It is well known that the surface of printing paper sheets is commonly coated with a paper coating formulation to improve the printability and to make it smooth and glossy.

Paper coating compositions generally comprise fillers or pigments dispersed in water, polymeric binders, rheology modifiers, water retention agents and dispersing agents (see by way of example "Handbook for Pulp & Paper Technology", G. A. Smook, Angus Publications).

Dispersing agents are indispensable to reduce the viscosity in the presence of the high solid contents which are typical of paper coating compositions and to maintain a constant desired processing viscosity. Examples of conventional dispersing agents are complex phosphates, salts of polyphosphoric acid and salts of polycarboxylic acids.

Water retention agents prevent dewatering of the coating composition upon contact with the surface of the paper sheet. A typical water retention agent for paper coating composition is carboxymethyl cellulose.

Rheology modifiers are added to modulate the paper coating viscosity. Binders are responsible for the cohesion of the final coating and for its adhesion to the paper sheet.

Some conventional paper coating additives are known to perform more than one function; by way of example, carboxymethyl cellulose acts both as rheology modifier and water retention agent, whereas polyvinyl alcohol acts both as water retention agent and optical brightness enhancer.

WO 01/96007, WO 2004/044022, WO 2004/041883 and WO 2007/069037 describe the use of polyacrylic anionic copolymers in the paper industry, for making or coating paper; the polyacrylic anionic copolymers contain at least one anionic ethylenically unsaturated monomer having monocarboxylic functionality and at least one non-ionic ethylenically unsaturated monomer having poly($C_{2-4}$-alkylene oxide) functionalities. They are said to be useful as dispersing and/or grinding agents, as agents for improving the optical brightening activation, as water retention agents, as viscosity and gloss enhancers. Unfortunately, when the known ionic substances are used in aqueous dispersions in accordance with the prior art, their effectiveness is dependent on the pH value of the dispersion.

It has now been found that specific polyethers containing polyoxyethylene chains, some of which have not been previously described in the literature, are suitable as deflocculants, water retention agents and gloss enhancer for paper coating compositions; the resulting paper coating compositions are stable over a wide viscosity range irrespective of their pH value and impart good printability and brightness to the coated paper.

The polyethers containing polyoxyethylene chains are water soluble and can be used for the preparation of paper coating compositions in the form of aqueous solution.

BRIEF DESCRIPTION OF THE INVENTION

The present invention relates to paper coating compositions containing:

i) from 30 to 80% by weight of inorganic pigment; ii) from 0.05 to 3.0 parts by weight each 100 parts by weight of pigment of a polyether having poly(ethylene oxide) content higher than 60% by weight and obtained by reacting: a) 1 equivalent of a polyol containing at least one polyoxyethylene chain —$(CH_2CH_2O)_n$— in which n is a number comprised between 15 and 500; b) from 0.4 to 1.3 equivalents of a diglycidyl ether of formula (I):

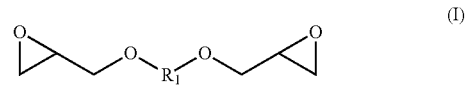

in which $R_1$ is the radical (i):

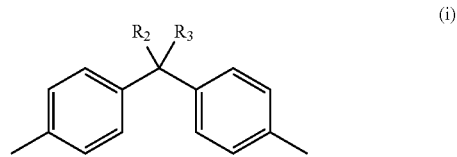

in which $R_2$, $R_3$ are each independently Me, Et or H;

or $R_1$ is phenylene, optionally substituted with one or more alkyl group;

or $R_1$ is biphenylene, optionally substituted with one or more alkyl group;

or $R_1$ is the radical (ii):

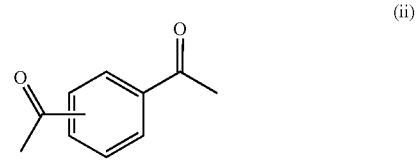

or $R_1$ is a linear or branched aliphatic alkylene radical containing from 2 to 6 carbon atoms; c) from 0 to 1 equivalents of a monofunctional alcohol;

iii) at least 15% by weight of water.

The present invention further relates to polyethers having poly(ethylene oxide) content higher than 60% by weight that are obtained by reacting: a) 1 equivalent of a polyol (Adduct A) which is the reaction product of 1 equivalent of a monofunctional alcohol containing a polyoxyethylene chain —$(CH_2CH_2O)_n$— in which n is a number comprised between 15 and 500 and 1 equivalent of a diglycidyl ether of formula (I):

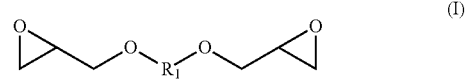

in which $R_1$ is the radical (i):

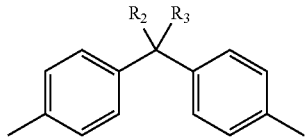

in which $R_2$, $R_3$ are each independently Me, Et or H;

or $R_1$ is phenylene, optionally substituted with one or more alkyl group;

or $R_1$ is biphenylene, optionally substituted with one or more alkyl group;

or $R_1$ is the radical (ii):

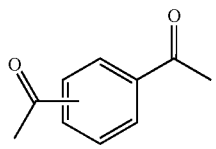

or $R_1$ is a linear or branched aliphatic alkylene radical containing from 2 to 6 carbon atoms; b) from 0.4 to 1.3 equivalents of a diglycidyl ether of formula (I); c) from 0 to 1 equivalent of a monofunctional alcohol.

The invention also relates to aqueous solutions comprising from 20 to 60% by weight of polyethers having poly(ethylene oxide) content higher than 60% by weight that are obtained by reacting: a) 1 equivalent of a polyol (Adduct A) which is the reaction product of 1 equivalent of a monofunctional alcohol containing a polyoxyethylene chain —$(CH_2CH_2O)_n$— in which n is a number comprised between 15 and 500 and 1 equivalent of a diglycidyl ether of formula (I):

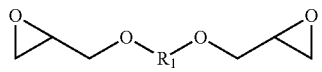

in which $R_1$ is the radical (i):

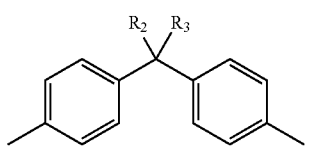

in which $R_2$, $R_3$ are each independently Me, Et or H;

or $R_1$ is phenylene, optionally substituted with one or more alkyl group;

or $R_1$ is biphenylene, optionally substituted with one or more alkyl group;

or $R_1$ is the radical (ii):

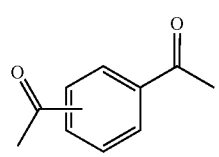

or $R_1$ is a linear or branched aliphatic alkylene radical containing from 2 to 6 carbon atoms; b) from 0.4 to 1.3 equivalents of a diglycidyl ether of formula (I); c) from 0 to 1 equivalent of a monofunctional alcohol.

DETAILED DESCRIPTION

In the present text with the expression "poly(ethylene oxide) content" we mean the content of —$(CH_2CH_2O)_n$— units with n>2 that are contained in the polyether.

The polyethers useful for the paper coating compositions are characterized by the fact that they contain polyoxyethylene chains —$(CH_2CH_2O)_n$— in which n is a number comprised between 15 and 500, preferably from 40 to 500, and have poly(ethylene oxide) content higher than 60% by weight, preferably higher than 70% by weight.

Any polyol containing at least one polyoxyethylene chain —$(CH_2CH_2O)_n$— in which n is a number comprised between 15 and 500, preferably from 40 to 500, and containing at least two hydroxyl groups —OH which are able to react with the epoxide groups of the diglycidyl ether of formula (I) may be used as component a) for the preparation of the polyethers. Polyols a) which are particularly useful are diols and in particular polyethylene glycol and the product (Adduct A) which is obtained by reacting 1 equivalent of a monofunctional alcohol containing a polyoxyethylene chain —$(CH_2CH_2O)_n$— in which n is a number comprised between 15 and 500, preferably from 40 to 500, and 1 equivalent of a diglycidyl ether of formula (I).

It is also possible to use a mixture of polyols as the polyol a), and particularly a mixture of polyethylene glycols and of Adduct A.

The polyethers which are preferred for the preparation of the paper coating compositions are obtained by using Adduct A as the polyol a).

In one embodiment, the components a), b), and c) sum up to at least 95 wt % of the components of the polyether, the possible additional components consisting of from 0 to 5% by weight of other nonionic polyols having molecular weight below 1,000 and containing two or more hydroxyl groups; examples of such utilizable nonionic polyols are glycerol, pentaerythritol, neopentylglycol, butanediol, 1,4-cyclohexanedimethanol, trimethylolpropane and its derivatives, such as propoxylated trimethylolpropane, polyfunctional polybutadienes and polyesters polyols.

In a preferred form of this embodiment the components a), b) and c) sum up to 100% by weight of the components of the polyether.

Advantageously, in the diglycidyl ether of formula (I) $R_1$ is the radical (i) in which $R_2$, $R_3$ are methyl groups; the glycidyl end-capped reaction products of epichlorohydrin and bisphenol A having low molecular weight may be used as the source of the diglycidyl ether of formula (I).

The component c) is a monofunctional alcohol that preferably comprises at least one polyoxyethylene chain —$(CH_2CH_2O)_n$— in which n is a number from 15 to 500, more preferably from 40 to 500.

Preferably, the monofunctional alcohol c) has formula RO—$(CH_2CH_2O)_n$—H in which R is a linear or branched $C_1$-$C_6$ alkyl radical.

Examples of monoalcohols that can be used are methoxypolyethylene glycol and butoxypolyethyleneglycol.

According to a particular embodiment of the present invention, both the polyol a) and the monofuncional alcohol c), beside polyoxyethylene chains, may also contain polyoxypropylene chains; the weight percentage of such additional chains shall be selected to provide polyethers having poly(propylene oxide) content between 5 and 30% by weight; it has been observed that the water retention performance obtained with paper coating compositions comprising polyethers that also contain polyoxypropylene chains is remarkably high.

More preferably the polyethers shall have an overall poly(propylene oxide) content from 5 to 20% by weight and a total content of poly(ethylene oxide) and poly(propylene oxide) higher than 90% by weight.

The polyethers of the invention have molecular weight higher than 5,000, preferably from 10,000 to 200,000; when polymers are concerned, the term molecular weight used in this text means the number average molecular weight.

The molecular weight of the polyethers may be regulated by opportunely dosing the equivalents of the reagents a), b) and c), as it is well known by the person skilled in the art.

In the preparation of the polyethers it is preferred to use ratios of the reagents that provide hydroxyl-terminated polyethers, free from epoxide groups (as determined by standard test method ASTM 1652-04), and particularly to use 1 equivalent of polyol a) from 0.4 to 0.9 equivalents of diglycidyl ether of formula (I) and 0 equivalents of monofunctional alcohol c).

The polyethers of the invention may be prepared by reacting the components a), b) and optionally c) in the presence of a basic catalyst at temperature preferably comprised between 80 and 150° C., till complete disappearance of the epoxide groups.

Suitable solvents may be used in the preparation of the polyethers, but it is also possible to carry out all the preparation steps with the neat reagents, without the use of water or of any organic solvent.

The polyethers of the invention are water soluble compounds; they are preferably nonionic and devoid of ionizable groups, such as carboxylic and sulfonic acid groups.

The thus obtained polyethers are advantageously dissolved in water to provide aqueous solutions with dry content comprised between 20 and 60% by weight, because they are perfectly soluble in water and provide transparent solutions having Brookfield® viscosity between 50 and 5,000 mPa*s that can be easily dosed in the paper coating compositions.

The paper coating compositions of the invention comprise: a) from 30 to 80% by weight, preferably from 60 to 80% by weight, of inorganic pigment; b) from 0.05 to 3.0 parts by weight each 100 parts by weight of pigment of the above described polyethers; c) at least 15% by weight of water, and have Brookfield® viscosity at 25° C. and 100 rpm of less than 3,000 mPa·s, preferably from 500 to 2,000 mPa·s.

The inorganic pigments of the paper coating compositions, preferably have from 40 to 90% of the particles finer than 2 microns, and they are those normally employed in the coating of paper, in particularly kaolin, calcium carbonate, talc, titanium dioxide, barium sulfate, gypsum, or mixture thereof.

Since the polyethers of the invention does not act per se as pigment dispersants, the paper coating compositions according to the present invention advantageously also comprise from 0.01 to 3% by weight of a dispersing agent and also a specific rheology modifier.

Examples of useful dispersing agents are anionic non-crosslinked polyacrylate derivatives, such as sodium polyacrylate, having molecular weight from 5,000 to 40,000.

Typical useful rheology modifiers are carboxymethyl cellulose, hydroxypropyl guar, hydroxypropylmethyl cellulose, xanthan gum, ASA polymers (i.e. "Alkali Swellable Acrylic" polymers).

Dispersing agents, which are common ingredients of paper coating compositions, are not generally able to prevent the flocculation of the finest particles, especially when the paper coating composition is being applied on the paper sheet, i.e. under high shear stress conditions, and the particles flocculation is detrimental to the smoothness and the gloss of the resulting coated paper.

The polyethers of the present invention are also particularly effective as deflocculants, avoiding the formation of clusters of fine particles, which may tend to settle.

The paper coating compositions of the invention normally also comprise from 1 to 10% by weight of a binder, preferably a polymeric acrylic binder.

Among the polymeric acrylic binders preferred for the realisation of the invention we cite the polymers of acrylic or methacrylic acid esters, the copolymers of acrylic ester monomers and vinyl acetate, styrene, butadiene or mixtures thereof.

Other conventional additives, such as defoaming agents, biocides, optical brighteners, may be present in the paper coating compositions.

The water soluble polyethers according to the invention are useful as water retention agents, deflocculant and viscosity stabilizer for paper coating compositions and provide coated paper with excellent printability, brightness and gloss.

Another advantageous characteristic of the polyurethanes of the invention is the fact that they act as rheology and water retention buffers over different batches of industrial paper coating compositions having the same recipe; this means that, in the industrial coating process, the usual deviations from the theoretical amounts of paper coating ingredients do not affect its rheology and water retention characteristics.

EXAMPLES

In the examples the following products have been used:

PEG4000: Polyethylene glycol, average molecular weight 4,000 g/mol BuPEG5000: butoxy-(polyethylene glycol), average molecular weight 5,000 g/mol DGEBA: Poly(Bisphenol A-co-epichlorohydrin), glycidyl end-capped, from Dow Chemical Company, average molecular weight 380 g/mol Example 1

400.0 g (0.1 mol) of PEG4000 are charged in a 1 liter reaction vessel equipped with internal thermometer, stirrer and cooler and heated to 115° C.; 1.25 g of 40% KOH and 22.8 g (0.06 mol) of DGEBA are charged.

The reaction temperature was maintained for 5 hours until disappearance of the epoxide groups (as determined in this example and in the following examples by standard test method ASTM D1652-04).

634.0 g of water are added.

The obtained product had 39.76%wt dry content, viscosity 228 mPa·s (measured by Brookfield® viscometer at 20 rpm) and pH 13.2.

Example 2

In a reaction vessel like that of Example 1 400.0 g (0.1 mol) of PEG4000 are charged and heated to 115° C.; 1.0 g of 40% KOH and 26.6 g (0.07 mol) of DGEBA are charged.

The reaction temperature was maintained for 5 hours until disappearance of the epoxide groups. 632.0 g of water are added. The obtained product had 40.88%wt dry content, viscosity 1,000 mPa·s (measured by Brookfield® viscometer at 20 rpm) and pH 10.0.

Example 3

In a reaction vessel like that of Example 1 400.0 g (0.1 mol) of PEG4000 and 150.0 g (0.03 mol) of BuPEG5000 are charged and heated to 115° C.; 1.0 g of 40% KOH and 38.0 g (0.1 mol) of DGEBA are charged.

The reaction temperature was maintained for 5 hours until disappearance of the epoxide groups. Water is added.

The obtained product had 40.65% wt dry content, viscosity 660 mPa·s (measured by Brookfield® viscometer at 20 rpm) and pH 10.0.

Example 4

In a reaction vessel equipped with internal thermometer, stirrer and cooler 400.0 g (0.08 mol) of BuPEG5000 are charged and heated to 115° C.; 1.75 g of 40% KOH and 15.2 g (0.04 mol) of DGEBA are charged.

The reaction temperature is maintained for 2 hours until disappearance of the epoxide groups to obtain an Adduct A.

12.2 g (0.032 mol) of DGEBA are added and the reaction temperature is maintained for 3 hours until disappearance of the epoxide groups. 200.0 g of the reaction product are charged under stirring in 600.0 g of water.

The obtained product had 26.34% wt dry content, viscosity 74 mPa·s (measured by Brookfield® viscometer at 20 rpm) and pH 12.4.

Example 5

In a reaction vessel equipped with internal thermometer, stirrer and cooler 400.0 g (0.08 mol) of BuPEG5000 are charged and heated to 115° C.; 1.75 g of 40% KOH and 15.2 g (0.04 mol) of DGEBA are charged.

The reaction temperature is maintained for 2 hours until disappearance of the epoxide groups to obtain an Adduct A.

18.3 g (0.048 mol) of DGEBA are added and the reaction temperature is maintained for 3 hours until disappearance of the epoxide groups. 200.0 g of the reaction product are charged under stirring in 600.0 g of water.

The obtained product had 26.15%wt dry content, viscosity 96 mPa·s (measured by Brookfield® viscometer at 20 rpm) and pH 12.0.

Example 6

In a reaction vessel equipped with internal thermometer, stirrer and cooler 400.0 g (0.08 mol) of BuPEG5000 are charged and heated to 115° C.; 1.25 g of 40% KOH and 15.2 g (0.04 mol) of DGEBA are charged.

The reaction temperature is maintained for 2 hours until disappearance of the epoxide groups to obtain an Adduct A.

21.28 g (0.056 mol) of DGEBA are added and the reaction temperature is maintained for 3 hours until disappearance of the epoxide groups. 200.0 g of the reaction product are charged under stirring in 600.0 g of water.

The obtained product had 26.85%wt dry content, viscosity 42 mPa·s (measured by Brookfield® viscometer at 20 rpm) and pH 8.9.

Example 7

In a reaction vessel equipped with internal thermometer, stirrer and cooler 400.0 g (0.08 mol) of BuPEG5000 are charged and heated to 115° C.; 1.25 g of 40% KOH and 15.2 g (0.04 mol) of DGEBA are charged.

The reaction temperature is maintained for 2 hours until disappearance of the epoxide groups to obtain an Adduct A.

24.32 g (0.064 mol) of DGEBA are added and the reaction temperature is maintained for 3 hours until disappearance of the epoxide groups. 200.0 g of the reaction product are charged under stirring in 600.0 g of water.

The obtained product had 26.26%wt dry content, viscosity 50 mPa·s (measured by Brookfield® viscometer at 20 rpm) and pH 11.7.

Application Examples

Paper coating compositions based on 100% carbonate (Hydrocarb 90, from Omya, CH) were prepared using the polyethers from Examples 1 to 7 and with a water retention agent of the prior art (Viscolam GP37, from Lam berti SpA, IT).

The compositions and the characteristics of the paper coating compositions are reported in Table 1; the amounts of the ingredients are parts by weights.

The paper coating compositions were characterized by performing the following measurements:
pH
Brookfield@ viscosity, 100 rpm
Dry matter
Water retention—Tappi Method T710

The data obtained are also reported in Table 1.

The paper coating compositions were applied (13 g/m$^2$) on offset sheets (80 g/m$^2$); the sheets were conditioned for 24 h at 21 ° C. and 50% r.h. and calendared (cylinders temperature 55° C., pressure 67.5 Kg/cm; 4 nips).

Brightness and gloss values were measured and are reported in Table 2.

TABLE 1

|  | 1 | 2 | 3 | 4 | 5 | 6 | 7 | 8[3)] |
|---|---|---|---|---|---|---|---|---|
| PAPER COATING COMPOSITIONS: | | | | | | | | |
| HYDROCARB 90 | 100 | 100 | 100 | 100 | 100 | 100 | 100 | 100 |
| DOW LATEX 935[1)] | 10 | 10 | 10 | 10 | 10 | 10 | 10 | 10 |

TABLE 1-continued

|  | 1 | 2 | 3 | 4 | 5 | 6 | 7 | 8[3)] |
|---|---|---|---|---|---|---|---|---|
| TINOPAL ABPZ[2)] | 1 | 1 | 1 | 1 | 1 | 1 | 1 | 1 |
| Ex. 1 | 0.5 | / | / | / | / | / | / | / |
| Ex. 2 | / | 0.5 | / | / | / | / | / | / |
| Ex. 3 | / | / | 0.5 | / | / | / | / | / |
| Ex. 4 | / | / | / | 0.5 | / | / | / | / |
| Ex. 5 | / | / | / | / | 0.5 | / | / | / |
| Ex. 6 | / | / | / | / | / | 0.5 | / | / |
| Ex. 7 | / | / | / | / | / | / | 0.5 | / |
| Viscolam GP37 | / | / | / | / | / | / | / | 0.15 |
| Water | q.s. | q.s. | q.s. | q.s. | q.s. | q.s. | q.s. | q.s. |
| CHARACTERISTICS OF THE PAPER COATING COMPOSITIONS | | | | | | | | |
| Dry matter (%) | 69.11 | 68.98 | 69.09 | 69.54 | 69.27 | 69.41 | 69.44 | 69.75 |
| pH | 9.10 | 9.01 | 8.99 | 8.96 | 9.07 | 9.00 | 8.96 | 8.95 |
| Viscosity (mPa * s) | 1,400 | 1,000 | 1,000 | 1,040 | 1,430 | 1,000 | 950 | 1,050 |
| Water retention (g/m$^2$) | 168 | 171 | 176 | 175 | 152 | 185 | 179 | 188 |

[1)]Binder, styrene butadiene latex (Dow Chemical Co. US)
[2)]Optical brightener (CIBA, CH)
[3)]comparative

TABLE 2

| PAPER COATING COMPOSITION: | °Brightness[1)] | Gloss @ 75°[2)] |
|---|---|---|
| 1 | 97.7 | 60.5 |
| 2 | 96.9 | 61.4 |
| 3 | 97.0 | 61.4 |
| 4 | 97.2 | 63.9 |
| 5 | 97.7 | 62.0 |
| 6 | 97.1 | 60.5 |
| 7 | 97.3 | 61.0 |
| 8[3)] | 96.9 | 58.5 |

[1)]Brightness, Tappi Method T452
[2)]Specular Gloss at 75°, Tappi Method T480
[3)]comparative

The invention claimed is:

1. A paper coating compositions comprising:

i) from 30 to 80% by weight of inorganic pigment; and ii) from 0.05 to 3.0 parts by weight each 100 parts by weight of pigment of a polyether having poly(ethylene oxide) content higher than 60% by weight;

wherein the polyether is prepared by reacting:

a) 1 equivalent of a polyol containing at least one polyoxyethylene chain —(CH$_2$CH$_2$O)n- in which n is from about 15 to about 500;

b) from 0.4 to 1.3 equivalents of a diglycidyl ether of formula (I):

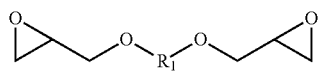

(I)

in which R$_1$ is the radical (i):

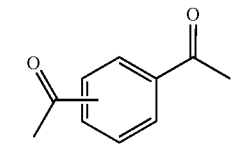

(i)

wherein R$_2$, R$_3$ are each independently Me, Et or H;
   or R$_1$ is phenylene, optionally substituted with one or more alkyl group;
   or R$_1$ is biphenylene, optionally substituted with one or more alkyl group;
   or R$_1$ is the radical (ii):

(ii)

or R$_1$ is a linear or branched aliphatic alkylene radical containing from 2 to 6 carbon atoms; c) from 0 to 1 equivalents of a monofunctional alcohol; and iii) at least 15% by weight of water.

2. The paper coating composition of claim 1 in which the polyether has a poly (propylene oxide) content of from 5 to 30% by weight.

3. The paper coating composition of claim 1 in which the polyether is obtained from a polyol which is prepared by reacting 1 equivalent of a monofunctional alcohol containing a polyoxyethylene chain —(CH$_2$CH$_2$O)n- in which n is from about 15 to about 500, with 1 equivalent of a diglycidyl ether of formula (I) (Adduct A).

4. The paper coating composition of claim 2 in which the polyether is obtained from a polyol which is prepared by reacting 1 equivalent of a monofunctional alcohol containing a polyoxyethylene chain —(CH₂CH₂O)n- in which n is from about 15 to about 500, with 1 equivalent of a diglycidyl ether of formula (I) (Adduct A).

5. The paper coating composition of claim 1 in which in the diglycidyl ether of formula (I) R₁ is the radical (i) wherein R₂, R₃ are methyl groups.

6. The paper coating composition of claim 2 in which in the diglycidyl ether of formula (I) R₁ is the radical (i) wherein R₂, R₃ are methyl groups.

7. The paper coating composition of claim 3 in which in the diglycidyl ether of formula (I) R₁ is the radical (i) wherein R₂, R₃ are methyl groups.

8. The paper coating composition of claim 4 in which in the diglycidyl ether of formula (I) R₁ is the radical (i) wherein R₂, R₃ are methyl groups.

9. The paper coating composition of claim 1 in which the from 60 to 80% by weight of inorganic pigment is selected from the group consisting of kaolin, calcium carbonate, talc, titanium dioxide, barium sulfate, gypsum, and mixtures thereof.

10. The paper coating composition of claim 2 in which the from 60 to 80% by weight of inorganic pigment is selected from the group consisting of kaolin, calcium carbonate, talc, titanium dioxide, barium sulfate, gypsum, and mixtures thereof.

11. The paper coating composition of claim 3 in which the from 60 to 80% by weight of inorganic pigment is selected from the group consisting of kaolin, calcium carbonate, talc, titanium dioxide, barium sulfate, gypsum, and mixtures thereof.

12. The paper coating composition of claim 4 in which the from 60 to 80% by weight of inorganic pigment is selected from the group consisting of kaolin, calcium carbonate, talc, titanium dioxide, barium sulfate, gypsum, and mixtures thereof.

13. The paper coating composition of claim 1 in which the polyether is obtained by reacting 1 equivalent of polyol a) with from 0.4 to 0.9 equivalents of diglycidyl ether of formula (I) and 0 equivalents of monofunctional alcohol c).

14. A polyether having a poly(ethylene oxide) content higher than 60% by weight obtained by reacting:
   a) 1 equivalent of a polyol (Adduct A) which is the reaction product of 1 equivalent of a monofunctional alcohol containing a polyoxyethylene chain —(CH₂CH₂O)n- in which n is from about 15 to about 500, and 1 equivalent of a diglycidyl ether of formula (I):

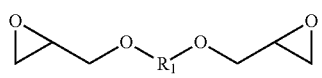

in which
R₁ is the radical (i):

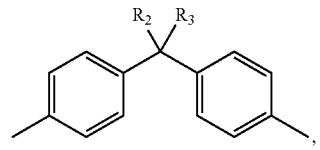

R₂, R₃ are each independently Me, Et or H,
or R₁ is phenylene, optionally substituted with one or more alkyl group,
or R₁ is biphenylene, optionally substituted with one or more alkyl group,
or R₁ is the radical (ii):

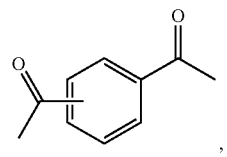

or
   or R₁ is a linear or branched aliphatic alkylene radical containing from 2 to 6 carbon atoms;
   b) from 0.4 to 1.3 equivalents of a diglycidyl ether of formula (I); and
   c) from 0 to 1 equivalent of a monofunctional alcohol.

15. The polyether of claim 14 in which in the diglycidyl ether of formula (I) R₁ is the radical (i) wherein R₂, R₃ are methyl groups.

16. The polyether of claim 14 prepared by reacting 1 equivalent of polyol a) with from 0.4 to 0.9 equivalents of diglycidyl ether of formula (I) and 0 equivalents of monofunctional alcohol c).

17. The polyether of claim 15 prepared by reacting 1 equivalent of polyol a) with from 0.4 to 0.9 equivalents of diglycidyl ether of formula (I) and 0 equivalents of monofunctional alcohol c).

18. An aqueous solution comprising from 20 to 60% by weight of the polyether of claim 14.

19. The aqueous solution of claim 18 in which in the diglycidyl ether of formula (I) R₁ is the radical (i) wherein R₂, R₃ are methyl groups.

20. The aqueous solution of claim 18 in which the polyether is prepared by reacting 1 equivalent of polyol a) with from 0.4 to 0.9 equivalents of diglycidyl ether of formula (I) and 0 equivalents of monofunctional alcohol c).

* * * * *